United States Patent
Marschalkowski et al.

(10) Patent No.: US 9,479,053 B2
(45) Date of Patent: Oct. 25, 2016

(54) FAST LOAD TRANSIENT RESPONSE SYSTEM FOR VOLTAGE REGULATORS

(71) Applicant: Dialog Semiconductor GmbH, Kirchheim/Teck-Nabern (DE)

(72) Inventors: Eric Marschalkowski, Inning am Ammersee (DE); Pietro Gambetta, Munich (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 49 days.

(21) Appl. No.: 14/558,057

(22) Filed: Dec. 2, 2014

(65) Prior Publication Data

US 2015/0160669 A1   Jun. 11, 2015

(30) Foreign Application Priority Data

Dec. 10, 2013  (EP) .................................... 13196443

(51) Int. Cl.
*H02M 3/158* (2006.01)
*G05F 1/59* (2006.01)
*H02M 3/156* (2006.01)

(52) U.S. Cl.
CPC ................ *H02M 3/158* (2013.01); *G05F 1/59* (2013.01); *H02M 3/1588* (2013.01); *H02M 2003/1566* (2013.01)

(58) Field of Classification Search
CPC ...................... H02M 1/32; H02M 2003/1566; H02H 7/1213; H02H 7/1216; H02H 3/20; H02H 3/22; H02H 9/042; H02H 9/046
USPC ......... 363/50, 56.12; 361/111; 323/288, 284, 323/285, 286
See application file for complete search history.

(56) References Cited

U.S. PATENT DOCUMENTS

| | | | |
|---|---|---|---|
| 5,889,392 A | 3/1999 | Moore et al. | |
| 5,926,384 A * | 7/1999 | Jochum | H02M 3/1584 361/90 |
| 6,359,796 B2 * | 3/2002 | Hartular | H02M 3/1584 361/111 |
| 6,903,914 B1 * | 6/2005 | Moussaoui | H02M 1/34 361/111 |
| 6,975,162 B2 * | 12/2005 | Tamura | G05F 1/56 323/312 |
| 8,159,805 B2 * | 4/2012 | Feng | H02M 3/156 361/111 |
| 9,059,631 B2 * | 6/2015 | Park | H02M 1/32 |
| 9,112,413 B2 * | 8/2015 | Barth | H03F 3/00 |
| 9,166,476 B2 * | 10/2015 | Harada | H02M 3/156 |

(Continued)

OTHER PUBLICATIONS

European Search Report 13196443.9-1809 Mailed: May 30, 2014, Dialog Semiconductor GmbH.

*Primary Examiner* — Jue Zhang
*Assistant Examiner* — Kyle J Moody
(74) *Attorney, Agent, or Firm* — Saile Ackerman LLC; Stephen B. Ackerman (57) ABSTRACT

A circuit and a method for improving the performance of voltage regulators subject to load transients is presented. An auxiliary circuit generates an auxiliary current at an output of a voltage regulator. The auxiliary circuit comprises transient detection means to detect a load transient at the output of the voltage regulator. The auxiliary circuit comprises an auxiliary impedance to be coupled at one end to the output of the voltage regulator, and an auxiliary switch to modify a voltage level at the other end of the auxiliary impedance by closing or opening the auxiliary switch. The auxiliary circuit comprises a control unit to control the auxiliary switch, subject to the detection of a load transient at the output of the voltage regulator, to modify the voltage level at the other end of the auxiliary impedance.

25 Claims, 6 Drawing Sheets

(56) References Cited

U.S. PATENT DOCUMENTS

| | | | |
|---|---|---|---|
| 9,257,905 B1* | 2/2016 | Kotikalapoodi | H02M 3/156 |
| 2002/0015319 A1 | 2/2002 | Hartular et al. | |
| 2009/0237854 A1* | 9/2009 | Mok | H02M 3/156 |
| | | | 361/111 |
| 2010/0033153 A1* | 2/2010 | Xing | H02M 3/156 |
| | | | 323/288 |
| 2012/0049829 A1* | 3/2012 | Murakami | H02M 1/32 |
| | | | 323/288 |
| 2012/0153922 A1* | 6/2012 | Chen | H02M 3/156 |
| | | | 323/288 |
| 2012/0306586 A1* | 12/2012 | Wan | H02M 3/156 |
| | | | 332/109 |
| 2013/0162235 A1 | 6/2013 | Harada | |
| 2013/0214858 A1* | 8/2013 | Tournatory | H02M 3/156 |
| | | | 330/127 |
| 2014/0125299 A1* | 5/2014 | Barth | H03F 3/00 |
| | | | 323/266 |
| 2014/0340061 A1* | 11/2014 | Ueno | H02M 3/156 |
| | | | 323/282 |

* cited by examiner

FAST LOAD TRANSIENT RESPONSE SYSTEM FOR VOLTAGE REGULATORS

TECHNICAL FIELD

The present document relates to voltage regulators. In particular, the present document relates to a method and a corresponding system for improving the performance of voltage regulators subject to load transients.

BACKGROUND

Voltage regulators typically have a finite transient response capability. Linear regulators may be limited by bandwidth and pass device size, while single and multiphase switching converters may react to load transients by delivering current to the load through coils of the switching converters. Also enhanced control systems that allow immediate turn-on of all the phases of a multiphase power converter immediately after detection of the load transient, by overriding the clock of the multiphase power converter, have to wait for the coil to build up sufficient current at the output of the power converter according to the formula: $dI/dt=V/L$, wherein I is the coil current (contributing to the output current of the power converter), V is the voltage drop at the coil and L is the inductance of the coil.

As an example in buck converters the finite speed at which the coil of the buck converter can build up current makes the output build up an error which is equal to the amount of the charge resulting from the difference between the load current and the total coil current divided by the total filter capacitance C. This leads to an error voltage $$V_{error} = \frac{1}{C}\int (Iload - Icoil)dt$$

wherein $V_{error}$ is the deviation of the actual output voltage of the power converter from the target output voltage, wherein Iload is the actual load current, which is drawn by a load at the output of the power converter, and wherein Icoil is the coil current, which builds up according to the above mentioned formula. The load current Iload may exhibit a steep transient, whereas the coil current Icoil builds up with a pre-determined ramp. This may lead to significant undershoots and/or overshoots of the output voltage of the power converter. Such undershoots and/or overshoots of the output voltage may affect the operation of the load which is coupled to the power converter.

SUMMARY

The present document addresses the above mentioned technical problem. In particular, the present document describes a circuit and a corresponding method for reducing the error voltage $V_{error}$ of a power converter (also referred to as a voltage regulator), subject to a load transient. According to an aspect, an auxiliary circuit configured to generate an auxiliary current at an output of a voltage regulator is described. The auxiliary current may be generated in order to stabilize an output voltage of the voltage regulator, subject to a load transient. A load transient typically corresponds to a sudden increase in a load current, which is drawn by a load that is coupled to the voltage regulator (positive load transient) or to a sudden decrease in the drawn load current (negative load transient). The voltage regulator typically comprises one or more inductors which limit a ramp-up or ramp-down of the output current of the voltage regulator. As a result of this, the load current may deviate from the output current, thereby leading to an undershoot or an overshoot (i.e. to a negative deviation or a positive deviation) of the output voltage from a pre-determined reference voltage. Such undershoots/overshoots of the output voltage may have negative impacts on the load and should therefore be avoided.

The auxiliary circuit may be configured to provide, subject to a load transient, an auxiliary current which complements the output current with respect to the drawn load current, thereby stabilizing the output voltage. In particular, the auxiliary circuit may be configured to provide an additional auxiliary current such that the sum of the output current of the voltage regulator and the auxiliary current corresponds to the increased load current. In a similar manner, the auxiliary circuit may be configured to sink an auxiliary current (i.e. provide a negative auxiliary current) such that the sum of the output current of the voltage regulator and the auxiliary current corresponds to the decreased load current.

The auxiliary circuit comprises transient detection means configured to detect a load transient at the output of the voltage regulator. The transient detection means may be configured to detect a load transient based on the output voltage at the output of the voltage regulator. In particular, the transient detection means may be configured to detect a load transient based on the output voltage and based on the reference voltage, which is used by the voltage regulator to regulate the output voltage. The transient detection means may comprise an error amplifier configured to determine an error signal indicative of a deviation and/or a gradient of deviation of the output voltage from the reference voltage.

A positive error signal may be indicative of a positive load transient and a negative error signal may be indicative of a negative load transient. The transient detection means may comprise a first comparator configured to detect a negative load transient by determining whether the error signal is smaller than or equal to a pre-determined first threshold. The first threshold may be a negative value. Alternatively or in addition, the transient detection means may comprise a second comparator configured to detect a positive load transient by determining whether the error signal is greater than or equal to a pre-determined second threshold. The second threshold may be a positive value.

The auxiliary circuit may comprise an auxiliary impedance configured to be coupled at one end to the output of the voltage regulator. The auxiliary current may flow through the auxiliary impedance. In particular, the auxiliary impedance may be configured to shape the auxiliary current along the time line. The auxiliary impedance may be such that the auxiliary circuit may react to a load transient with a peak auxiliary current, in order to compensate for the steep increase or decrease of the load current. The peak auxiliary current may be positive in case of a positive load transient and negative in case of a negative load transient. Furthermore, the auxiliary impedance may be such that subsequent to the peak auxiliary current, the magnitude of the auxiliary current decreases with a certain ramp. The ramp may be complimentary to the ramp of the output current which is provided by the voltage regulator. Typically, the ramp of the output current of the voltage regulator is dependent on one or more inductors of the voltage regulator.

Hence, the characteristics (e.g. a capacitance and/or resistance) of the auxiliary impedance may be dependent on the characteristics (e.g. the inductance) of the one or more inductors comprised within the voltage regulator.

As indicated above, the voltage regulator may be configured to provide an output current with a pre-determined temporal ramp, subject to the load transient. This means that the output current may increase or decrease in accordance to the pre-determined temporal ramp. The gradient of the temporal ramp typically depends on the one or more inductors comprised within the voltage regulator. The auxiliary impedance may be such that the auxiliary current complements the output current with respect to the load current at the output of the voltage regulator. In other words, the auxiliary impedance may be designed such that the absolute difference of the sum of auxiliary current and output current and of the load current is smaller (in average) than the absolute difference of the output current and of the load current.

In order to complement the output current with respect to the (to-be-provided) load current, the auxiliary impedance may be configured to reduce a magnitude of the auxiliary current in accordance to a pre-determined time constant starting from the peak auxiliary current at the time instant, when the load transient is detected. The pre-determined time constant may be used to model the complement of the ramp of the output current of the voltage regulator. By way of example, the auxiliary impedance may comprise an auxiliary capacitor which is arranged in series with an auxiliary resistor. As such, the auxiliary impedance may comprise an RC circuit with a pre-determined time constant. The pre-determined time constant (i.e. the capacitance and/or resistance of the RC circuit) may be determined in dependence of the inductance of the one or more inductors of the voltage regulator. By doing this, it may be ensured that the sum of the auxiliary current and the output current matches the load current (even subject to a load transient).

The auxiliary circuit further comprises an auxiliary switch configured to modify a voltage level at the other end of the auxiliary impedance by closing or opening the auxiliary switch. By way of example, the auxiliary switch may be configured to increase the voltage at the other end of the auxiliary impedance from a first voltage to a second voltage, subject to the detection of a positive load transient. The increased voltage may trigger the generation of a positive auxiliary current through the auxiliary impedance towards the output of the voltage regulator. In a similar manner, the auxiliary switch may be configured to decrease the voltage at the other end of the auxiliary impedance from the first voltage to a third voltage, subject to the detection of a negative load transient. The decreased voltage may trigger the generation of a negative auxiliary current through the auxiliary impedance drawn from the output of the voltage regulator. The first voltage may be a quiescent voltage which is generated by an analog buffer of the auxiliary circuit. The second voltage may correspond to a supply voltage and the third voltage may correspond to ground. Hence, the auxiliary switch may be used to trigger the start (and the end) of the generation of the auxiliary current. The level of the first, second and/or third voltages may be used to control the magnitude of the peak auxiliary current, which is generated at the time instant when the auxiliary switch is closed.

The auxiliary circuit further comprises a control unit configured to control the auxiliary switch, subject to the detection of a load transient at the output of the voltage regulator, to modify the voltage level at the other end of the auxiliary impedance such that an auxiliary current is flowing through the auxiliary impedance, when the one end of the auxiliary impedance is coupled to the output of the voltage regulator. Hence, the control unit may be configured to close the auxiliary switch (e.g. using a gate control signal) and to thereby increase or decrease the voltage level at the other end of the auxiliary impedance, and to thereby generate a positive or negative auxiliary current through the auxiliary impedance, respectively.

Hence, the auxiliary circuit is configured to immediately react to a load transient and to generate an immediate peak auxiliary current to account for the increased or decreased load current. In dependence on the characteristics of the auxiliary impedance, the magnitude of the auxiliary current decreases, possibly in accordance to the ramp-up or ramp-down of the output current of the voltage regulator. Hence, the current at the output of the voltage regulator may be matched with the load current, thereby stabilizing the output voltage of the voltage regulator.

As already indicated above, the auxiliary circuit may comprise a buffer coupled to the other end of the auxiliary impedance and configured to set the other end of the auxiliary impedance to a quiescent voltage (also referred to as the first voltage), when the auxiliary switch is open. The auxiliary switch may be configured to couple the other end of the auxiliary impedance to the supply voltage (to generate a positive auxiliary current) or to ground (to generate a negative auxiliary current), when the auxiliary switch is closed. A level of the quiescent voltage may be a fraction of the supply voltage. By setting the other end of the auxiliary impedance to a voltage level between ground and supply voltage, the auxiliary circuit may be configured to compensate positive and negative load transients, because the voltage level of the other end of the auxiliary impedance may be increased, subject to a positive load transient, and decreased, subject to a negative load transient. Hence, the flexibility of the auxiliary circuit may be increased.

The level of the quiescent voltage may be set to be greater than half the supply voltage for tuning the auxiliary circuit towards a transient decrease of the load current at the output of the voltage regulator. By increasing the level of the quiescent voltage, the magnitude of the peak auxiliary current in case of negative load transients may be increased. On the other hand, the level of the quiescent voltage may be set to be smaller than half the supply voltage for tuning the auxiliary circuit towards a transient increase of the load current at the output of the voltage regulator. By decreasing the level of the quiescent voltage, the magnitude of the peak auxiliary current in case of positive load transients may be increased.

The auxiliary switch may be a high side switch of a half bridge and may be configured to couple the other end of the auxiliary impedance to the supply voltage, when the auxiliary switch is closed. Furthermore, the auxiliary circuit may comprise a second auxiliary switch. The auxiliary switches may comprise or may be metal oxide semiconductor (MOS) transistors. The second auxiliary switch may be a low side switch of the half bridge and may be configured to couple the other end of the auxiliary impedance to ground, when the second auxiliary switch is closed. The high side switch and the low side switch may be used to enable the auxiliary circuit to generate a positive auxiliary current, subject to a positive load transient, and to generate a negative auxiliary current, subject to a negative load transient. The above mentioned buffer may be used to set the midpoint of the half bridge to the quiescent voltage, thereby preparing the auxiliary circuit for a positive and a negative load transient.

It should be noted that if it can be ensured that a positive load transient is directly followed by a negative load transient, and vice versa, a buffer may not be required, as the compensation of a positive load transient automatically prepares the auxiliary circuit for the compensation of a negative load transient, and vice versa.

The control unit may be configured to close the auxiliary switch, subject to the detection of a positive load transient. Furthermore, the control unit may be configured to close the second auxiliary switch, subject to the detection of a negative load transient. In particular, the control unit may comprise logic circuitry which is configured to generate a gate control signal for opening or closing the auxiliary switch and/or the second auxiliary switch based on an output of the first and/or second comparators, e.g. based on a positive detection signal (indicating a positive load transient) and/or based on a negative detection signal (indicating a negative load transient). Hence, the opening and closing of the auxiliary switches may be controlled in dependence on the output voltage of the voltage regulator.

The control unit may be configured to maintain the auxiliary switch and the second auxiliary switch open, at a time instant when no load transient is detected. The time instants, when no load transients are detected, may be used to set the midpoint of the half bridge to the quiescent voltage, in order to prepare the auxiliary circuit for positive and negative load transients.

The control unit may be configured to control the auxiliary switch such that, subject to the detection of a load transient, the auxiliary current is provided for a pre-determined duration. The pre-determined duration may be dependent on the characteristics of the auxiliary impedance (e.g. dependent on a time constant of the auxiliary impedance). In particular, the pre-determined duration may be dependent on the capacitance and/or resistance of the auxiliary impedance.

Alternatively, the control unit may be configured to control the auxiliary switch such that, subject to the detection of a load transient, the auxiliary current is provided for a duration which is dependent on an output voltage of the voltage regulator. In particular, the duration may be dependent on the deviation of the output voltage from the reference voltage. The provision of the auxiliary current may be interrupted, if the deviation falls below a pre-determined threshold.

According to a further aspect, a method for generating an auxiliary current at an output of a voltage regulator is described. The method comprises detecting a load transient at the output of the voltage regulator. Furthermore, the method comprises providing an auxiliary impedance which is configured to be coupled at one end to the output of the voltage regulator. In addition, the method comprises providing an auxiliary switch which is configured to modify a voltage level at the other end of the auxiliary impedance by closing or opening the auxiliary switch. Furthermore, the method comprises controlling the auxiliary switch, subject to the detection of a load transient at the output of the voltage regulator, to modify the voltage level at the other end of the auxiliary impedance such that an auxiliary current is flowing through the auxiliary impedance, when the one end of the auxiliary impedance is coupled to the output of the voltage regulator.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

Figure 1:
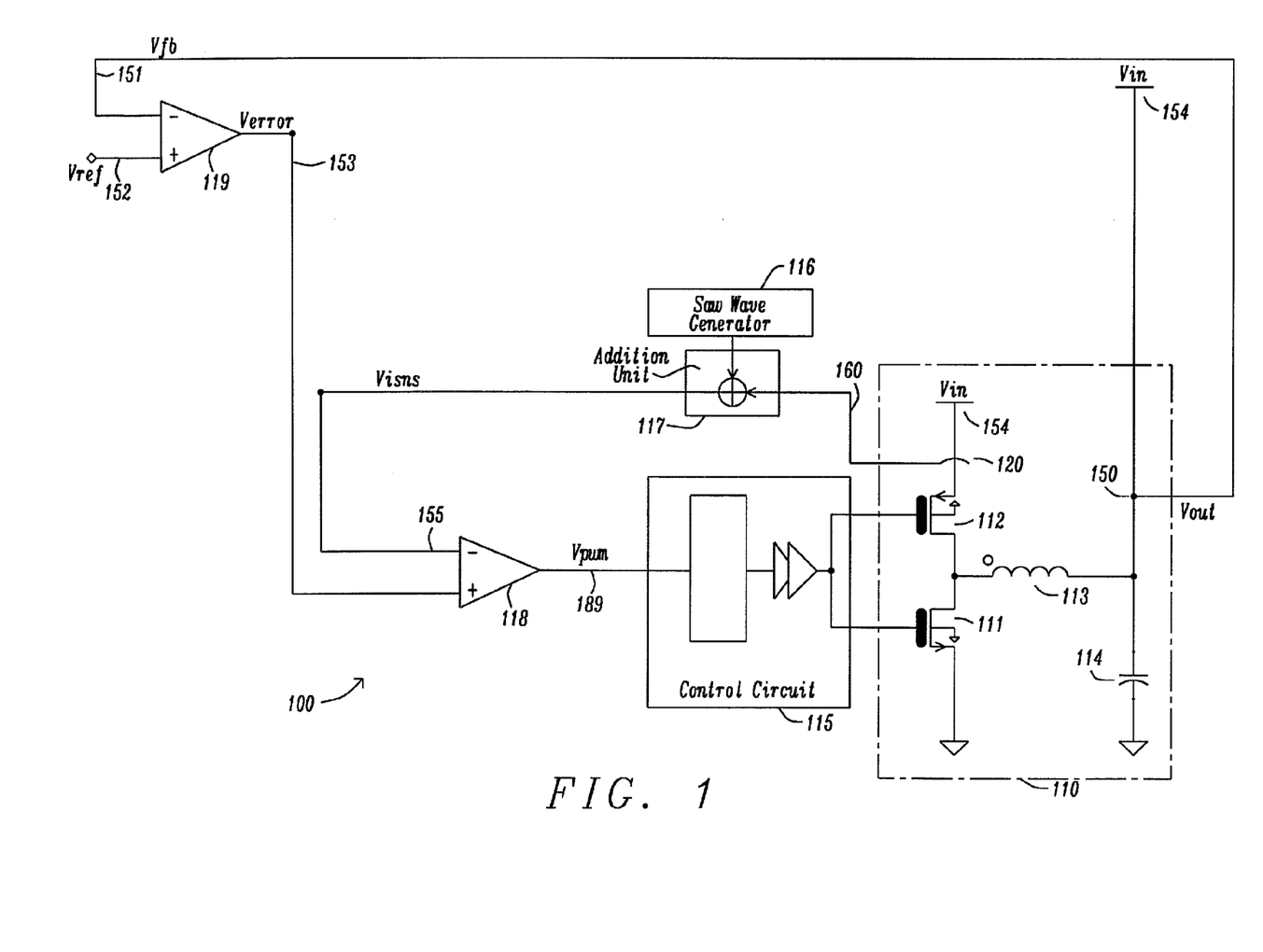
FIG. 1 illustrates a circuit diagram of an example voltage regulator.

FIG. 1 shows an example buck converter system 100. It should be noted that even though the following aspects are described in the context of a buck converter 110, the aspects are also applicable to other DC-to-DC converters, e.g. other DC-to-DC step-down converters or DC-to-DC step-up converters. The system 100 comprises a buck converter 110 comprising a high side switch 112 (e.g. a PMOS transistor) and a low side switch 111 (e.g. a NMOS transistor), as well as a buck inductor 113 and a buck capacitor 114. The duty cycle of the buck converter 110 (i.e. the duty cycle of the high side switch 112) is controlled via a feedback voltage Vfb 151 which is equal to (or proportional to) the output voltage Vout 150. The feedback voltage Vfb 151 is compared to a reference voltage Vref 152 using e.g. a differential amplification unit (also referred to as an error amplifier) 119, thereby providing an error voltage Verror 153. In stable operation, when the output voltage Vout 150 corresponds to the desired output voltage of the converter system 100, the error voltage Verror 153 should approximate zero or should take on a pre-determined default error value (e.g. zero) which may be tuned using the reference voltage Vref 152. However, in case of load transients, the output voltage Vout 150 may dip, thereby causing a bump in the error voltage Verror 153 above the default error value.

Overall, the error voltage Verror 153 may be used to regulate the output voltage Vout 150 provided by the converter system 100. The regulation of the output voltage Vout 150 may be achieved by controlling the duty cycle of the high side switch 112. This duty cycle may be controlled using the error voltage Verror 153. For example, the error voltage Verror 153 may be compared with a saw wave voltage signal 155 having a pre-determined cycle length (thereby providing a pre-determined and fixed commutation cycle rate). The cycle length typically corresponds to the cycle length of the buck converter 110 (i.e. the length of an on-state and a succeeding off-state of the high side switch 112). The saw wave voltage signal 155 typically has a maximum voltage Vsaw at the peak of each saw tooth. The saw wave voltage signal may be generated by the saw wave generator 116. The saw wave voltage signal 155 is compared to the error voltage Verror 153 using comparator 118 (e.g. a hysteretic comparator), thereby generating a pulse width modulated signal 189 which is negative (or zero) when the saw wave voltage signal is greater than Verror, and positive when the saw wave voltage is smaller than Verror. The transition from negative to positive may be taken as a trigger for the duty cycle. In particular, the pwm (pulse width modulated) signal generated by the comparator 118 may be converted by the buck control unit (also referred to as a control circuit) 115 to generate the drive signals for the high side switch 112 and for the low side switch 111 of the buck converter 110. The regulator can be tuned by appropriately choosing the maximum voltage Vsaw and the reference voltage Vref 152 based on the input voltage Vin 154 and/or based on the desired output voltage 150.

The regulation of the duty cycle of the buck converter 110 can be enhanced by also taking into account the inductor current, i.e. the current through the inductor 113 of the buck converter. For this purpose, the converter system 100 comprises current sensing means 120 for sensing the current through the high side transistor 112 (which corresponds to the inductor current when the high side switch 112 is in on-state (and the low side switch 111 is in off-state)). The current sensing means 120 may e.g. be implemented as a current mirror, which mirrors and possibly amplifies the current through the high side switch 112. The sensed current Isns 160 provided by the current sensing means 120 is therefore typically proportional (or equal) to the current through the high side switch 112 (and the inductor 113, when the high side switch is in its on-state). At 100% duty cycle of the buck converter 110 and in stable operation, the current through the high side switch 112 is typically constant and corresponds to the input voltage Vin 154 divided by the impedance of the load Rload of the converter system 100.

The sensed current Isns 160 is added in addition unit 117 to the saw wave signal having the cycle length of the buck converter 110. The adding unit 117 further converts the sum of the saw wave signal and the sensed current Isns 160 into a sensed saw wave voltage Visns 155. The saw wave signal may be generated by the saw wave generator 116 (comprising e.g. a switch (e.g. a transistor) in parallel to a capacitor). Overall, the saw wave generator 116 and the adding unit 117 provide the sensed saw wave voltage Visns 155 which comprises a periodic saw wave voltage signal (generated by the saw wave generator 116) which is offset by a voltage derived from the sensed current Isns 160. As indicated above, Isns 160 is a constant current in case of a stable operation of the buck converter 110 at 100% duty cycle. In such cases, the sensed saw wave voltage Visns 155 corresponds to the periodic saw wave voltage signal offset by a constant voltage derived from the constant current Isns 160. In case of a duty cycle lower than 100%, the sensed current Isns is zero (when the high side switch 112 is in off-state) and has a saw like rising shape (when the high side switch 112 is in on-state). The saw like rising shape of the sense current Isns 160 during the on-state of the high side switch 112 results from the current throttling properties of the inductor (also referred to as a coil) 113. Hence, in cases of a duty cycle of less than 100%, the sensed saw wave voltage Visns 155 is obtained as an overlay of the periodic saw wave voltage signal and an intermittent saw shaped voltage derived from the sensed current Isns 160. It should be noted that the sensed saw wave voltage Visns 155 may be reset every time the high side switch 112 is switched off. The reset of the sensed saw wave voltage Visns 155 may result in a cleaner signal. The sensed saw wave voltage Visns 155 is a signal with a positive slope. Visns 155 crosses the error voltage Verror 153, if the error voltage Verror 153 is in the range which is covered by the sensed saw wave voltage Visns 155 during a clock cycle (i.e. during a commutation cycle).

In the converter system 100 of FIG. 1, the sensed saw wave voltage Visns 155 is compared to the error voltage Verror 153 to generate the pulse width modulated signal pwm towards the driver and controller circuit 115 of the buck converter 110. In case of a load transient (e.g. a sudden increase of the load current), the sensed current Isns 160 increases, thereby increasing the slope of the sensed saw wave voltage Visns 155. At the same time, the output voltage Vout 150 may drop, leading to an increase of the error voltage Verror 153. Both effects tend to move forward the trigger point for the pulse width modulated signal pwm, thereby increasing the duty cycle of the buck converter 110 and thereby compensating the effect of the load transient.

Even with an increase of the duty cycle, the converter system 100 may not be able to provide the requested load current sufficiently fast. This is typically the case due to the ramp of the coil current (which is indicated by the sensed current 160) caused by the inductor 113. A load current (caused by an increasing load transient) which exceeds the coil current typically leads to a drop of the output voltage 150. On the other hand, a load current (caused by a decreasing load transient) which is lower than the coil current typically leads to an increase of the output voltage 150.

In the present document, an auxiliary circuit is described which is configured to reduce such overshoots and/or undershoots of the output voltage 150, subject to load transients.

Figure 2:
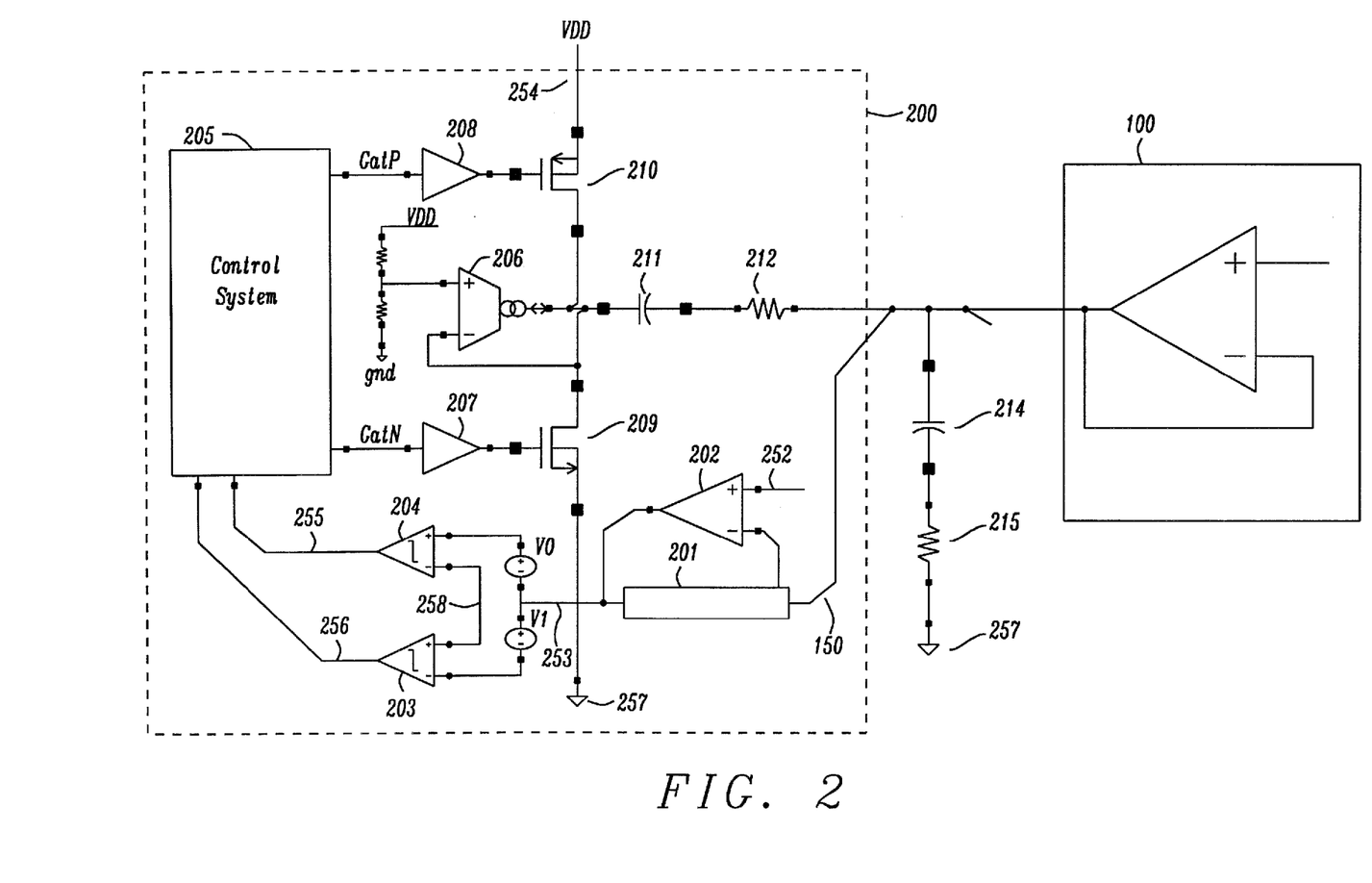
FIG. 2 shows a circuit diagram of an example circuit for reducing the error voltage of a voltage regulator subject to load transients.

An example of such an auxiliary circuit 200 is illustrated in FIG. 2. In FIG. 2 an auxiliary circuit 200 is arranged in parallel to a voltage regulator or converter system 100. The total load current to the output capacitor 214 and to an optional output resistor 215 results from the sum of the output current of the converter system 100 and of the output current of the auxiliary circuit 200. Hence, the auxiliary circuit 200 is configured to complement the output current of the converter system 100 (i.e. the coil current), notably in case of load transients.

The auxiliary circuit 200 comprises a half bridge 209, 210 and an auxiliary capacitor 211 or more generally and auxiliary impedance 211. The half bridge 209, 210 may be controlled using various different control strategies. The half bridge 209, 210 of the auxiliary circuit 200 may be used to deliver an immediate charge to the output capacitance 214 of the voltage regulator 100, when a load transient is detected.

FIG. 2 shows the auxiliary circuit 200 arranged in parallel to the voltage regulator 100. When a load transient occurs, the load transient may be amplified, detected and processed by the processing units 201, 202, 203, 204 and the control system 205 of the auxiliary circuit 200. The control system 205 may be configured to drive the half bridge comprising a low side switch 209 and a high side switch 210. It should be noted that alternatively to using a half bridge, a full bridge or a single pass device may be used. In the latter case, the auxiliary circuit 200 is typically limited to either positive or negative load transients.

An example auxiliary circuit 200 comprises an error amplifier 201, 202 which is configured to amplify the voltage drop 150 at the output of the voltage regulator 100. The amplified information may be detected using two comparators 203, 204, wherein a first comparator 203 may be used for detecting a negative load transient (i.e. a negative dI/dt) and wherein a second comparator 204 may be used for detecting a positive load transient (i.e. a positive dI/dt). If a positive or negative load transient is detected, the control logic (or control unit) 205 may be initiated. The control logic 205 may be configured to turn on the appropriate switch 209, 210 of the half bridge for delivering the required charge through the auxiliary capacitor 211 (or through a general auxiliary impedance). A current limited analog buffer 206 may be used to restore a charge into the auxiliary capacitor 211. The charge may be provided via a current limiting resistor 212, in order to avoid current peaks at the output capacitor 214.

In stable operation (when no load transient has been detected by the auxiliary circuit 200), the high side switch 210 and the load side switch 209 are open and the voltage regulator 100 is configured to provide the requested load current to the output of the regulator 100, such that the output voltage 150 is stable and corresponds to the pre-determined reference voltage 152 of FIG. 1. The auxiliary capacitor 211 may be pre-charged using the analog buffer 206. Hence, the midpoint between the high side switch 210 and the low side switch 209 (also referred to as the quiescent point) may be brought to a pre-determined quiescent point voltage $V_Q$ above the output voltage 150. The quiescent point voltage $V_Q$ may be used to tune the auxiliary circuit 200 towards positive load transients or towards negative load transients.

If a positive load transient is detected, the control unit 205 may trigger the driver 208 of the high side switch 210 to close the high side switch 210 and to couple the auxiliary capacitor 211 to the supply voltage VDD 254. As a result of this, the quiescent point is brought up from the quiescent point voltage $V_Q$ (due to pre-charging) to the supply voltage VDD 254. Hence, the charge $Q_{pos}=C_1*(VDD-V_Q)$ can be provided to the output of the auxiliary circuit 200. This positive charge $Q_{pos}$ may be provided as a transient auxiliary current $I_{aux}=(VDD-V_Q)/R_1$ which decays with a predetermined time constant $\tau=R_1*C_1$, wherein $R_1$ is the resistance of the auxiliary resistor 212 and wherein $C_1$ is the capacitance of the auxiliary capacitor 211. The additional auxiliary current at the output of the auxiliary circuit 200 may be used to complement the coil current which is provided by the voltage regulator 100 and to thereby stabilize the output voltage 150 (subject to a positive load current).

If a negative load transient is detected, the control unit 205 may trigger the driver 207 of the low side switch 209 to close the low side switch 209 and to couple the auxiliary capacitor 211 to ground 257. As a result of this, the quiescent point is brought down from the quiescent point voltage $V_Q$ (due to pre-charging) to ground level. As a result of this, the charge $Q_{neg}=C_1*V_Q$ can be drawn from the output of the auxiliary circuit 200. This negative charge $Q_{neg}$ may be drawn as a negative transient auxiliary current $I_{aux}=-V_Q/R_1$, the magnitude of which decays with the predetermined time constant $\tau=R_1*C_1$. The auxiliary current which is drawn at the output of the auxiliary circuit 200 may be used to reduce the coil current which is provided by the voltage regulator 100 and to thereby stabilize the output voltage 150 (subject to a negative load current).

It should be noted that the auxiliary capacitor 211 and the auxiliary resistor 212 are only one example of an auxiliary impedance 211, 212 which may be used to stabilize the output voltage 150 by providing or by drawing an auxiliary current. The auxiliary impedance 211, 212 may be lower than the impedance of the inductor 113 of the voltage regulator 100, at the operating frequency of the voltage regulator 100. This may ensure that the auxiliary circuit 200 provides the additional auxiliary current or draws the exceeding current, in case of a load transient.

The auxiliary circuit 200 is configured to provide the additional current (referred to as auxiliary current) or to draw the auxiliary current, based on an evaluation of the output voltage 150. The output voltage 150 may be used to detect the presence of a load transient. In other words, the output voltage 150 may be used to detect, whether an extra charge is required at the output of the voltage regulator 100 or whether an excessive charge needs to be removed from the output of the voltage regulator 100.

The detection of the need for extra charge or the detection of an excessive charge may be achieved by a dedicated error amplifier 202 that amplifies the difference between the reference voltage 252 (which may correspond to the reference voltage 152) and the output voltage 150 using a transfer function of the error amplifier 202, wherein the transfer function may depend on a feedback network 201. In an example, the gain of the error amplifier 202 may be one (a case which may be referred to as panic comparator). If the gain of the load transient error amplifier 202 is 1 or −1, the auxiliary circuit 200 is activated (i.e. one of the switches 210, 209 is closed), when the output voltage 150 drops under or goes above a certain threshold with respect to a desired voltage 258. In this case the load transient error amplifier 202 can also be bypassed and the comparators can be fed directly with the output voltage 150.

In a further example, a gain with an absolute value |Gain|>1 may be used, in order to increase the reaction speed subject to load transients. The reaction speed may be increased by increasing the gain of the error amplifier 202. If the gain of the error amplifier 202 corresponds to the main error amplifier gain of the error amplifier 119 of the voltage regulator 100, the comparators 203, 204 may be fed directly using the error voltage 153 (instead of using the error voltage 253 at the output of the error amplifier 202 of the auxiliary circuit 200), thereby reducing the cost of the auxiliary circuit 200.

The feedback network 201 may be used to implement a derivator (e.g. using a capacitor) In this case the system 200 reacts when the output voltage variation is faster than a pre-determined threshold. As a result of this, the system 200 may be configured to react prior to an actual development of an under/over voltage at the output of the voltage regulator 100.

The output signal 253 of the error amplifier 202 is passed to a first comparator 203 and a second comparator 204 which are configured to compare the output signal 253 with a reference signal 258 (which may be indicative of a threshold). The output signal 253 may be offset prior to entering the comparators 203, 204. As such, it may be determined whether the output signal 253 exceeds a second threshold (indicted by the positive detection signal 255) or whether the output signal 253 falls below a first threshold (indicated by a negative detection signal 256). Typically only one of the positive detection signal 255 or the negative detection signal 256 is set. The positive detection signal 255 may be indicative of a positive load transient and the negative detection signal 256 may be indicative of a negative load transient.

The control unit 205 may be configured to generate control signals "GatP" and/or "GatN" for controlling the switching state of the high side switch 210 (e.g. a PMOS transistor) and/or of the low side switch 209 (e.g. an NMOS transistor), respectively. As outlined above, in case of a positive detection signal 255, the high side switch 210 may be activated and in case of a negative detection signal 256, the low side switch 209 may be activated (while the respective other switch remains open). The switches 209, 210 may be maintained open for a fixed duration. The fixed duration may be selected in dependence of the time constant τ of the auxiliary impedance 211, 212 (e.g. the duration may correspond to 3 to 5 times the time constant τ). In other words, the fixed duration may be selected in dependence of the time interval during which the auxiliary circuit 200 is configured to provide (or to draw) a charge at the output of the auxiliary circuit 200.

Figure 3:
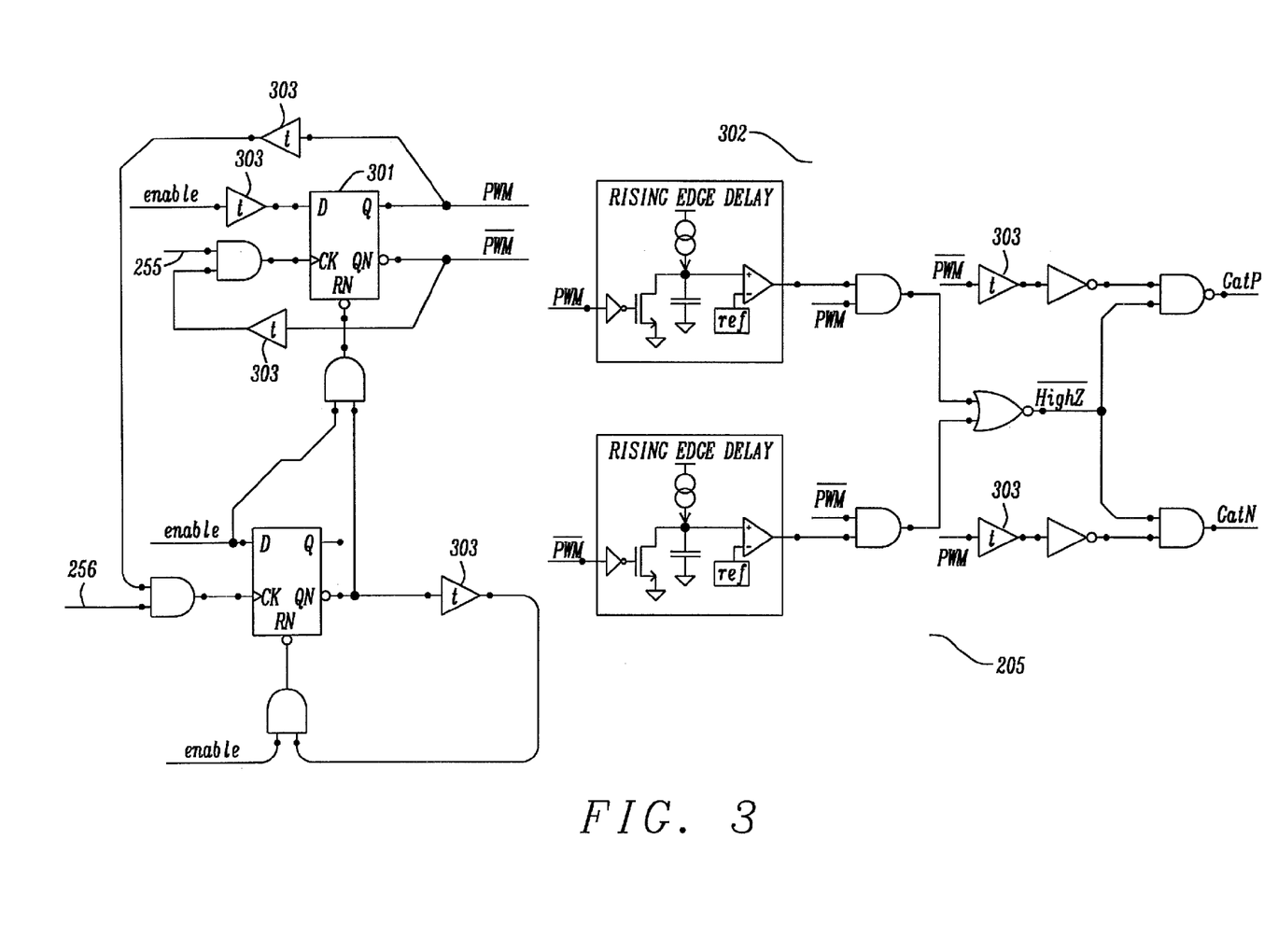
FIG. 3 shows a block diagram of an example control circuit for controlling the reduction of the error voltage of a voltage regulator.

Hence, when a load transient is detected a fixed time pulse (positive or negative according to the detection) may be generated and fed to the respective driver 207, 208, to allow for the charge delivery to (or the charge recovery from) the load capacitance 214. FIG. 3 shows a block diagram of an example control circuit 205 which may be used to generate such a fixed duration pulse "GatP" and/or "GatN" towards the drivers 208, 207 of the switches 210, 209, respectively.

The pulse is initiated by a detection signal 255, 256 of one of the comparators 204, 203. The detection signal 255, 256 may drive a set-reset latch 301 (SR latch). When a positive load transient is detected (positive detection signal 255), the SR latch 301 sets a PWM signal. When a negative load transient (negative detection signal 256) is detected, the SR latch 301 resets the PWM signal. The SR latch 301 is preferably race condition free (in case of the concurrent occurrence of a positive detection signal 255 and a negative detection signal 256). In other words, the SR latch 301 may be configured to resolve concurrent occurrences of the positive detection signal 255 and the negative detection signal 256, e.g. by generating an output in accordance to the temporally first one of the detection signals 255, 256.

The PWM signal may be fed to a pulse generator 302 that generates a fixed duration pulse on each edge of the pwm signal. On the positive edge of the pwm signal a (negative) pulse on the GatP output may be generated, which drives on the high side switch 210. On the negative edge of the pwm signal a (positive) pulse may be generated, which drives on the low side switch 209. The proposed structure of the control unit 205 ensures non-overlapping via a fixed duration dead time provided by the delays 303.

After one pulse is finished, i.e. after the fixed duration, the half bridge 210, 209 may be brought back in high impedance (by opening both switches 209, 210). The auxiliary capacitor $C_1$ 211 may then be recharged using the linear amplifier 206.

If the load release occurs earlier than the programmed pulse, the system 200 may be configured to start an off time without passing through the high impedance state. In particular, the auxiliary circuit 200 may be configured to pass from a charge provisioning state (where the high side switch 210 is closed) to a charge drawing state (where the low side switch 209 is closed) directly, without passing through the high impedance state (when both switches 210, 209 are open, and when the auxiliary capacitor 211 may be recharged).

As already indicated above, the pulse duration may be chosen coherently with respect to the time constant τ of the auxiliary impedance 211, 212 (e.g. 3-5 times the time constant τ).

Alternatively or in addition, the auxiliary circuit 200 may be operated using a hysteretic control. In particular, the duration of the pulses may be determined based on the output voltage 150 and/or based on the coil current and/or based on the load current. After detection of a load transient, the auxiliary circuit 200 may start to provide current or may start to draw current. The provision/drawing of current may be stopped, when it is detected (e.g. based on the output voltage) that the voltage regulator 100 is back in regulation (e.g. because the error voltage 253 falls below a pre-determined error threshold). Hence, the control unit 205 may be configured to close one of the switches 209, 210, based on the output voltage 150, and to thereby start the generation of an auxiliary current. Furthermore, the control unit 205 may be configured to open the switches 209, 210, based on the output voltage 150, and to thereby interrupt the auxiliary current.

As already indicated above, the voltage at the quiescent point between the switches 210, 209 (i.e. at the midpoint of the half bridge) may be regulated. As indicated, the amount of charge that the auxiliary circuit 200 can transfer to the output capacitor Cout 214 depends on the size $C_1$ of the auxiliary capacitor 211 and on the quiescent point voltage $V_Q$, the positive charge being $Q_{pos}=C_1*(VDD-V_Q)$, and the negative charge being $Q_{neg}=C_1*V_Q$. In the example of FIG. 2 a linear trans-conductance amplifier 206 recharges the auxiliary capacitor 211 with a limited current, so when no load transient is present, the midpoint of the half bridge is brought back up to a pre-determined quiescent point voltage $V_Q$. The value for $V_Q$ may be selected according to the application. By way of example, $V_Q<VDD/2$ may be selected, if substantial positive load transients are expected. On the other hand, $V_Q>VDD/2$ may be selected, if substantial negative load transients are expected.

Figure 4A:
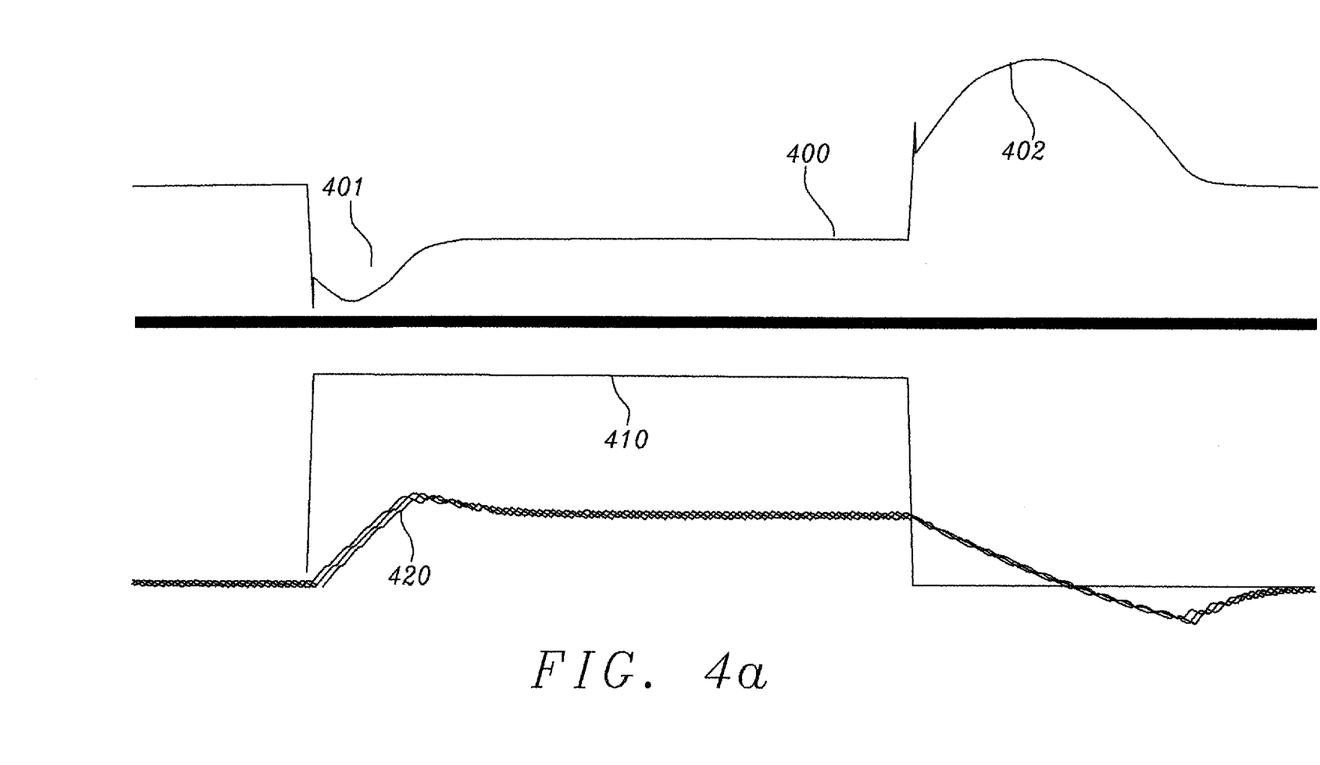
FIG. 4a illustrates example output voltages of a conventional voltage regulator.

FIG. 4a illustrates the output voltage 400 of a voltage regulator 100, subject to a load current transient 410. FIG. 4a also shows the coil currents 420 of a multiphase (three phase) voltage regulator 100. Since the load current 410 is very fast, the coil currents 420 cannot follow and a substantial undershoot 401 and overshoot 402 of the output voltage 400 are generated.

Figure 4B:
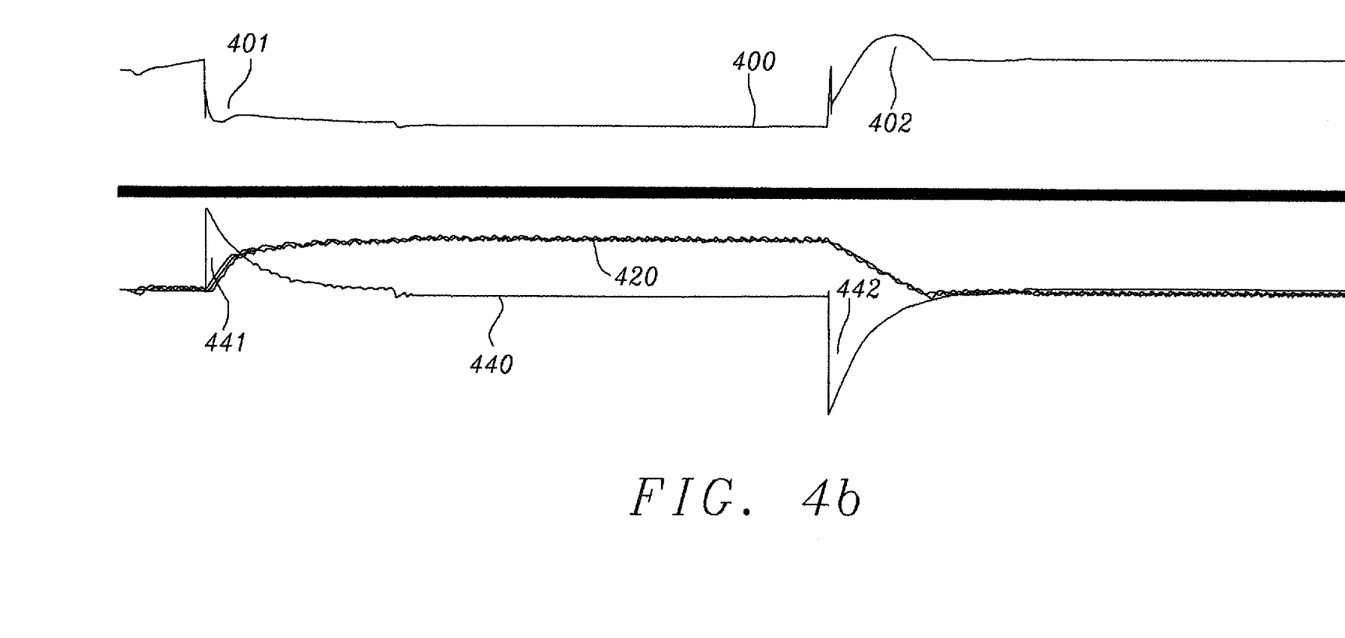
FIG. 4b illustrates example output voltages of a voltage regulator comprising a circuit for reducing the error voltage.

FIG. 4b shows the case of the load transient 410 when using an auxiliary circuit 200. It can be seen that the undershoot 401 and the overshoot 402 of the output voltage 400 are substantially reduced/removed. Furthermore, it can be seen that the auxiliary current 440 of the auxiliary circuit immediately increases (reference numeral 441) subject to the positive load transient. Furthermore, it can be seen that an auxiliary current 440 is drawn (reference numeral 442) subject to the negative load transient, thereby reducing/removing the undershoot 401 and the overshoot 402. Furthermore, the time constant τ of the auxiliary impedance 211, 212 of FIG. 2 is illustrated (as the decay of the auxiliary current 440 subsequent to the current peaks 441, 442).

Figure 5:
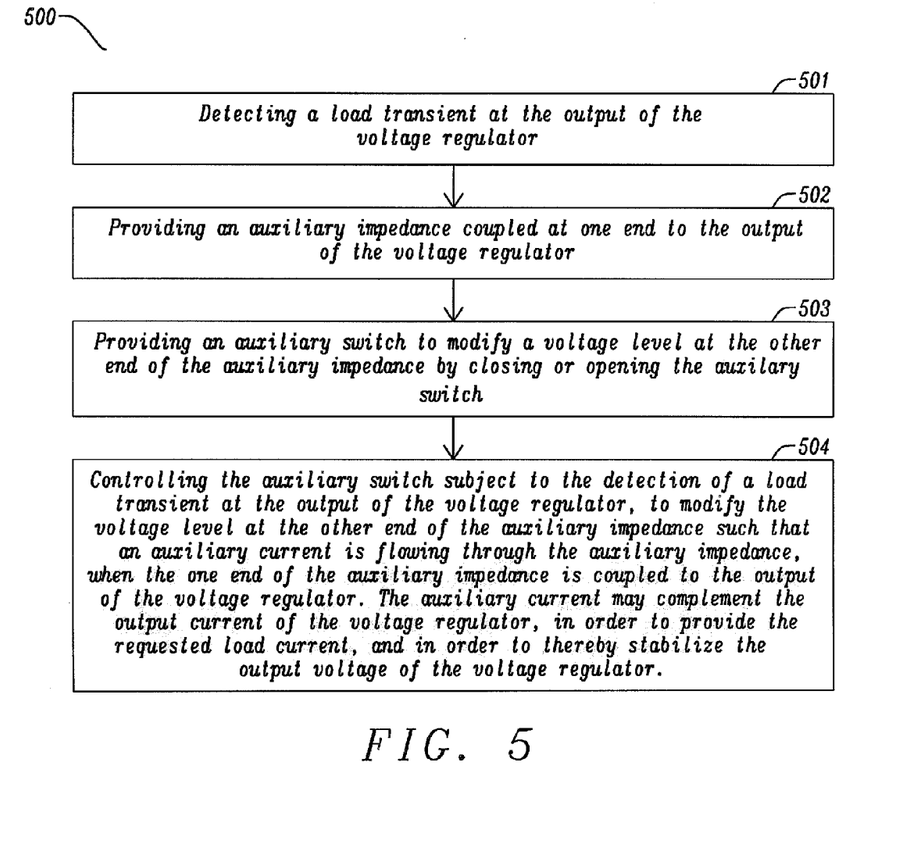
FIG. 5 shows a flow chart of an example method for reducing the error voltage of a voltage regulator.

FIG. 5 shows a flow chart of an example method 500 for reducing deviations of the output voltage 150 of a voltage regulator 100 from a reference voltage 152, subject to a load transient. In particular, the method 500 is directed at generating an auxiliary current at the output of a voltage regulator 100, such that the output voltage 150 is stabilized. The method 500 comprises detecting 501 a load transient at the output of the voltage regulator 100. The load transient may be detected e.g. using an error amplifier 202 and/or comparators 203, 204. Furthermore, the method 500 comprises providing 502 an auxiliary impedance 211, 212 which is configured to be coupled at one end to the output of the voltage regulator 100, and providing 503 an auxiliary switch 209, 210 (e.g. a high side switch 210 and/or a low side switch 109) configured to modify a voltage level at the other end of the auxiliary impedance 211, 212 by closing or opening the auxiliary switch 209, 210. In addition, the method 500 comprises controlling 504 the auxiliary switch 209, 210, subject to the detection of a load transient at the output of the voltage regulator 100, to modify the voltage level at the other end of the auxiliary impedance 211, 212 such that an auxiliary current is flowing through the auxiliary impedance 211, 212, when the one end of the auxiliary impedance 211, 212 is coupled to the output of the voltage regulator 100. The auxiliary current may complement the output current of the voltage regulator, in order to provide the requested load current, and in order to thereby stabilize the output voltage 150 of the voltage regulator 100.

In the present document, an auxiliary circuit has been described which may be used to reduce or remove over/undershoots of the output voltage of a voltage regulator subject to a load transient. The described auxiliary circuit may be used in conjunction with various different types of power converters/voltage regulators (e.g. buck converters, boost converters, buck/boost converters, etc.). In particular, the auxiliary circuit is AC (alternating current) coupled, and therefore allows for the use of various different types of converters.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. An auxiliary circuit configured to generate an auxiliary current at an output of a voltage regulator, the auxiliary circuit comprising
    transient detection means configured to detect a load transient at the output of the voltage regulator;
    an auxiliary impedance having a first end and a second end and being configured to be coupled at the first end to the output of the voltage regulator;
    an auxiliary switch configured to modify a voltage level at the second end of the auxiliary impedance by closing or opening the auxiliary switch; wherein the auxiliary switch is configured to couple the second end of the auxiliary impedance to a supply voltage or to ground, when the auxiliary switch is closed;
    a control unit configured to control the auxiliary switch, subject to the detection of the load transient at the output of the voltage regulator, to modify the voltage level at the second end of the auxiliary impedance such that an auxiliary current is flowing through the auxiliary impedance, when the first end of the auxiliary impedance is coupled to the output of the voltage regulator and
    a buffer coupled to the second end of the auxiliary impedance and configured to set the second end of the auxiliary impedance to a quiescent voltage, when the auxiliary switch is open; wherein a level of the quiescent voltage is greater than half the supply voltage for tuning the auxiliary circuit towards a transient decrease of a load current at the output of the voltage regulator; and wherein the level of the quiescent voltage is smaller than half the supply voltage for tuning the auxiliary circuit towards a transient increase of a load current at the output of the voltage regulator.

2. The auxiliary circuit of claim 1, wherein
    the voltage regulator is configured to provide an output current with a pre-determined ramp, subject to the load transient; and
    the auxiliary impedance is such that the auxiliary current complements the output current with respect to a load current at the output of the voltage regulator.

3. The auxiliary circuit of claim 1, wherein the auxiliary impedance comprises an auxiliary capacitor arranged in series with an auxiliary resistor.

4. The auxiliary circuit of claim 1, wherein
    the auxiliary switch is a high side switch of a half bridge and configured to couple the second end of the auxiliary impedance to a supply voltage, when the auxiliary switch is closed;
    the auxiliary circuit comprises a second auxiliary switch;
    the second auxiliary switch is a low side switch of the half bridge and configured to couple the second end of the auxiliary impedance to ground, when the second auxiliary switch is closed;
    the control unit is configured to close the auxiliary switch, subject to the detection of a positive load transient; and
    the control unit is configured to close the second auxiliary switch, subject to the detection of a negative load transient.

5. The auxiliary circuit of claim 4, wherein the control unit is configured to maintain the auxiliary switch and the second auxiliary switch open, at a time instant when no load transient is detected.

6. The auxiliary circuit of claim 1, wherein
    the control unit is configured to control the auxiliary switch such that, subject to the detection of the load transient, the auxiliary current is provided for a pre-determined duration; and
    the pre-determined duration is dependent on characteristics of the auxiliary impedance.

7. The auxiliary circuit of claim 6, wherein
    the auxiliary impedance is configured to reduce a magnitude of the auxiliary current in accordance to a time constant starting from a peak auxiliary current at a time instant, when the load transient is detected; and
    the pre-determined duration is dependent on the time constant of the auxiliary impedance.

8. The auxiliary circuit of claim 1, wherein the control unit is configured to control the auxiliary switch such that, subject to the detection of the load transient, the auxiliary current is provided for a duration which is dependent on an output voltage of the voltage regulator.

9. The auxiliary circuit of claim 1, wherein the transient detection means are configured to detect the load transient based on an output voltage at the output of the voltage regulator.

10. The auxiliary circuit of claim 9, wherein the transient detection means comprise an error amplifier configured to determine an error signal indicative of a deviation and/or a gradient of deviation of the output voltage from a reference voltage.

11. The auxiliary circuit of claim 10, wherein the transient detection means comprise
    a first comparator configured to detect a negative load transient by determining whether the error signal is smaller than or equal to a pre-determined first threshold; and
    a second comparator configured to detect a positive load transient by determining whether the error signal is greater than or equal to a pre-determined second threshold.

12. The auxiliary circuit of claim 11, wherein the control unit comprises logic circuitry to generate a gate control signal for opening or closing the auxiliary switch based on an output of the first and/or second comparators.

13. A method for generating an auxiliary current at an output of a voltage regulator, the method comprising the steps of:
  detecting a load transient at the output of the voltage regulator;
  providing an auxiliary impedance having a first end and a second end; wherein the auxiliary impedance to be coupled at the first end to the output of the voltage regulator;
  providing an auxiliary switch to modify a voltage level at the second end of the auxiliary impedance by closing or opening the auxiliary switch; wherein the auxiliary switch is configured to couple the second end of the auxiliary impedance to a supply voltage or to ground, when the auxiliary switch is closed; and
  controlling the auxiliary switch, subject to the detection of the load transient at the output of the voltage regulator, to modify the voltage level at the ether second end of the auxiliary impedance such that an auxiliary current is flowing through the auxiliary impedance, when the first end of the auxiliary impedance is coupled to the output of the voltage regulator;
  providing a buffer coupled to the second end of the auxiliary impedance and configured to set the second end of the auxiliary impedance to a quiescent voltage, when the auxiliary switch is open; wherein a level of the quiescent voltage is greater than half the supply voltage for tuning the auxiliary circuit towards a transient decrease of a load current at the output of the voltage regulator; and wherein the level of the quiescent voltage is smaller than half the supply voltage for tuning the auxiliary circuit towards a transient increase of a load current at the output of the voltage regulator.

14. A method for providing an auxiliary circuit to generate an auxiliary current at an output of a voltage regulator, the auxiliary circuit comprising the steps of:
  providing transient detection means to detect a load transient at the output of the voltage regulator;
  providing an auxiliary impedance having a first end and a second end; wherein the auxiliary impedance is to be coupled at the first end to the output of the voltage regulator;
  providing an auxiliary switch to modify a voltage level at the second end of the auxiliary impedance by closing or opening the auxiliary switch; wherein the auxiliary switch couples the second end of the auxiliary impedance to a supply voltage or to ground, when the auxiliary switch is closed;
  providing a control unit to control the auxiliary switch, subject to the detection of the load transient at the output of the voltage regulator, to modify the voltage level at the second end of the auxiliary impedance such that an auxiliary current is flowing through the auxiliary impedance, when the first end of the auxiliary impedance is coupled to the output of the voltage regulator; and
  providing a buffer coupled to the second end of the auxiliary impedance and to set the second end of the auxiliary impedance to a quiescent voltage, when the auxiliary switch is open; wherein a level of the quiescent voltage is greater than half the supply voltage for tuning the auxiliary circuit towards a transient decrease of a load current at the output of the voltage regulator; and wherein the level of the quiescent voltage is smaller than half the supply voltage for tuning the auxiliary circuit towards a transient increase of a load current at the output of the voltage regulator.

15. The method for providing an auxiliary circuit of claim 14, wherein
  the voltage regulator provides an output current with a pre-determined ramp, subject to the load transient; and
  the auxiliary impedance is such that the auxiliary current complements the output current with respect to a load current at the output of the voltage regulator.

16. The method for providing an auxiliary circuit of claim 14, wherein the auxiliary impedance comprises an auxiliary capacitor arranged in series with an auxiliary resistor.

17. The method for providing an auxiliary circuit of claim 14, wherein
  the auxiliary switch is a high side switch of a half bridge and couples the second end of the auxiliary impedance to a supply voltage, when the auxiliary switch is closed;
  the auxiliary circuit comprises a second auxiliary switch;
  the second auxiliary switch is a low side switch of the half bridge and couples the second end of the auxiliary impedance to ground, when the second auxiliary switch is closed;
  the control unit closes the auxiliary switch, subject to the detection of a positive load transient; and
  the control unit closes the second auxiliary switch, subject to the detection of a negative load transient.

18. The method for providing an auxiliary circuit of claim 17, wherein the control unit maintains the auxiliary switch and the second auxiliary switch open, at a time instant when no load transient is detected.

19. The method for providing an auxiliary circuit of claim 14, wherein
  the control unit controls the auxiliary switch such that, subject to the detection of the load transient, the auxiliary current is provided for a pre-determined duration; and
  the pre-determined duration is dependent on characteristics of the auxiliary impedance.

20. The method for providing an auxiliary circuit of claim 19, wherein
  the auxiliary impedance reduces a magnitude of the auxiliary current in accordance to a time constant starting from a peak auxiliary current at a time instant, when the load transient is detected; and
  the pre-determined duration is dependent on the time constant of the auxiliary impedance.

21. The method for providing an auxiliary circuit of claim 14, wherein the control unit controls the auxiliary switch such that, subject to the detection of the load transient, the auxiliary current is provided for a duration which is dependent on an output voltage of the voltage regulator.

22. The method for providing an auxiliary circuit of claim 14, wherein the transient detection means detect the load transient based on an output voltage at the output of the voltage regulator.

23. The method for providing an auxiliary circuit of claim 22, wherein the transient detection means comprise an error amplifier to determine an error signal indicative of a deviation and/or a gradient of deviation of the output voltage from a reference voltage.

24. The method for providing an auxiliary circuit of claim 23, wherein the transient detection means comprise
  a first comparator to detect a negative load transient by determining whether the error signal is smaller than or equal to a pre-determined first threshold; and
  a second comparator to detect a positive load transient by determining whether the error signal is greater than or equal to a pre-determined second threshold.

25. The method for providing an auxiliary circuit of claim 24, wherein the control unit comprises logic circuitry to generate a gate control signal for opening or closing the auxiliary switch based on an output of the first and/or second comparators.

* * * * *